US009652156B2

United States Patent
Alcantara et al.

(10) Patent No.: US 9,652,156 B2
(45) Date of Patent: *May 16, 2017

(54) HOST READ COMMAND RETURN REORDERING BASED ON TIME ESTIMATION OF FLASH READ COMMAND COMPLETION

(71) Applicant: HGST Netherlands B.V., Amsterdam (NL)

(72) Inventors: Joao Alcantara, Irvine, CA (US); Zoltan Szubbocsev, Haimhausen (DE)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,418

(22) Filed: May 13, 2016

(65) Prior Publication Data
US 2016/0253095 A1 Sep. 1, 2016

Related U.S. Application Data

(63) Continuation of application No. 14/680,657, filed on Apr. 7, 2015, now Pat. No. 9,354,814, which is a
(Continued)

(51) Int. Cl.
  *G06F 12/00* (2006.01)
  *G06F 3/06* (2006.01)
  *G06F 12/02* (2006.01)

(52) U.S. Cl.
  CPC .......... *G06F 3/061* (2013.01); *G06F 3/0605* (2013.01); *G06F 3/0659* (2013.01);
(Continued)

(58) Field of Classification Search
  CPC .. G06F 12/00; G06F 12/0629; G06F 12/0649; G06F 12/0646; G06F 12/14
(Continued)

(56) References Cited

U.S. PATENT DOCUMENTS 6,013,589 A    1/2000  DesMarais et al.
6,513,089 B1*  1/2003  Hofmann ............... G06F 13/28
                                                    710/107
(Continued)

FOREIGN PATENT DOCUMENTS

JP        201214433      1/2012
WO    WO2005006172 A2   1/2005
(Continued)

OTHER PUBLICATIONS

Combined Search and Examination Report under Sections 17 and 18(3), May 2, 2014, 6 pages, Patents Directorate.

*Primary Examiner* — Tuan Thai
(74) *Attorney, Agent, or Firm* — John D. Henkhaus

(57) ABSTRACT

Managing data returns to a host in response to read commands, an operation monitor of a solid-state drive (SSD) manages counters used to hold metrics that characterize the estimated time to complete a read operation on a corresponding flash die. A timer generates a periodic event which decrements the counters over time. The value stored in each counter is generated for flash operations submitted to the corresponding die and is, generally, based on the operational history and the physical location of the operation. Whenever a read command is scheduled for submission to a particular die, the time estimate for that particular read operation is retrieved and, based on this information, the optimum order in which to return data to the host is determined. This order is used to schedule and program data transfers to the host so that a minimum number of read commands get blocked by other read commands.

24 Claims, 4 Drawing Sheets

Related U.S. Application Data continuation of application No. 13/705,103, filed on Dec. 4, 2012, now Pat. No. 9,032,177.

(52) U.S. Cl.
CPC .......... *G06F 3/0679* (2013.01); *G06F 3/0688* (2013.01); *G06F 12/0246* (2013.01); *G06F 2206/1014* (2013.01); *G06F 2212/7205* (2013.01)

(58) Field of Classification Search
USPC ................................. 711/100, 154, 167, 170
See application file for complete search history.

(56) References Cited

U.S. PATENT DOCUMENTS

| | | | |
|---|---|---|---|
| 7,146,524 B2 * | 12/2006 | Patel | G06F 11/1076 707/E17.01 |
| 7,493,439 B2 * | 2/2009 | Gower | G06F 11/3419 710/260 |
| 7,512,762 B2 | 3/2009 | Gower et al. | |
| 7,802,061 B2 | 9/2010 | Qawami et al. | |
| 7,937,321 B2 | 5/2011 | Hoefelmeyer | |
| 7,937,421 B2 * | 5/2011 | Mikesell | H04N 21/6125 707/825 |
| 8,140,739 B2 | 3/2012 | Langlois et al. | |
| 2008/0276240 A1 | 11/2008 | Ganesh et al. | |
| 2010/0318718 A1 | 12/2010 | Eilert et al. | |
| 2011/0022781 A1 | 1/2011 | Wakrat et al. | |
| 2012/0008414 A1 | 1/2012 | Katz et al. | |

FOREIGN PATENT DOCUMENTS

| | | |
|---|---|---|
| WO | WO2005024832 A2 | 3/2005 |
| WO | WO2011000082 A1 | 1/2011 |
| WO | WO2012037293 A1 | 3/2012 |

* cited by examiner

HOST READ COMMAND RETURN REORDERING BASED ON TIME ESTIMATION OF FLASH READ COMMAND COMPLETION

CROSS-REFERENCE TO RELATED APPLICATIONS

This application is a continuation of and claims the benefit of priority to commonly-owned U.S. patent application Ser. No. 14/680,657 filed on Apr. 7, 2015, now U.S. Pat. No. 9,354,814, which is a continuation of U.S. patent application Ser. No. 13/705,103 filed on Dec. 4, 2012, now U.S. Pat. No. 9,032,177, the entire contents of which are incorporated by reference for all purposes as if fully set forth herein.

FIELD OF THE INVENTION

Embodiments of the invention relate to an estimation mechanism for determining the order in which to return data to a host from a solid-state drive (SSD).

BACKGROUND

A solid-state drive (SSD) is a data storage device that uses integrated circuit assemblies as memory units to store data persistently. SSD technology uses electronic interfaces compatible with traditional block input/output (I/O) hard disk drives (HDDs). SSDs do not employ any moving mechanical components, which distinguishes them from traditional HDDs which store data on rotating magnetic disks using movable read-write heads.

Currently, most SSDs use NAND-based flash memory, which is a form of non-volatile memory which retains data in the absence of power and which can be electrically erased and reprogrammed (as flash memory was developed from EEPROM). Further, hybrid drives combine features of both SSDs and HDDs in the same unit, typically containing a hard disk drive and an SSD cache to improve performance of frequently accessed data. Flash memory stores information in an array of memory cells made from floating-gate transistors.

Enterprise SSD implementations, e.g., in servers, are typically held to different and higher performance standards than are desktop and laptop HDD and SSD drives. That is, enterprise SSDs are typically required to provide relatively high I/O performance. Therefore, optimum pure read and mixed read/write performance is a goal of many SSD development engineers.

SUMMARY OF EMBODIMENTS OF THE INVENTION

Embodiments of the invention are directed towards managing data returns to a host in response to read commands, for use in a solid-state drive (SSD) storage device. Optimum pure read and mixed read/write performance is influenced by the order in which data is returned to the host, and the order in which data is returned to the host does not necessarily correspond to the order in which the host sent the read commands.

According to an embodiment, an operation monitor of a solid-state drive (SSD) is configured for managing counters used to manage metrics that characterize the estimated time to complete a read operation on a corresponding flash die, i.e., an operation cost. The operation monitor initiates a timer that generates a periodic event which decrements the counters. The value stored in each counter is generated for flash operations submitted to the corresponding die and is, generally, based on the history and the physical location of the operation. Whenever a read command is scheduled for submission to a particular die, controller firmware, for example, is able to retrieve the time estimate for that particular flash read operation. Based on this information the optimum order in which to return data to the host is determinable. This order is used to schedule and program data transfers to the host, where an optimum order describes a sequence in which a minimum number of read commands get blocked by other read commands when the blocker commands do not have their corresponding data available to be returned to the host.

According to an embodiment of a method for managing returns to a host in response to read commands received by an SSD device, a data command is received from a host and an operation cost is generated for each operation submitted to a respective non-volatile memory die. Each operation cost is decremented based on a timer that generates a periodic event (e.g., a clock tick). Thus, the operation cost represented in the counter decreases over time, just as the time to read the corresponding die decreases over time. The total cost of the read command that was received from the host is computed based on the current operation costs for each operation submitted to each respective non-volatile memory die associated with the read command. Based on the total cost of the read command, the order in which to return the requested data to the host is determined, relative to other read commands received from the host.

Embodiments discussed in the Summary of Embodiments of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to managing data returns to a host in response to read commands from the host, for use in a solid-state drive (SSD) storage device, are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Solid State Drive Configuration

Figure 1:
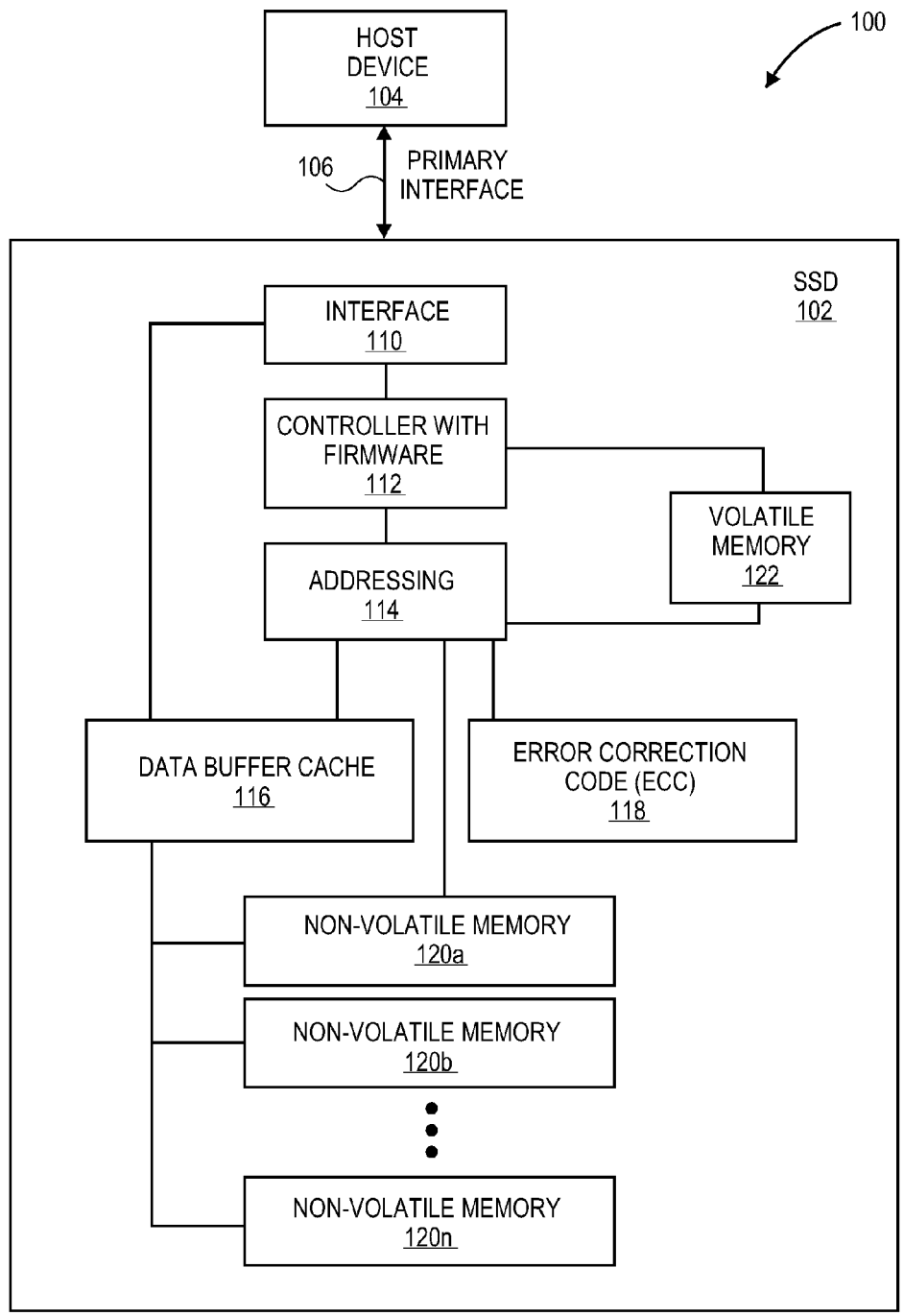
FIG. 1 is a block diagram illustrating an example operating environment in which embodiments of the invention may be implemented.

Embodiments of the invention may be used to manage a solid-state drive (SSD) storage device. FIG. 1 is a block diagram illustrating an example operating environment in which embodiments of the invention may be implemented. FIG. 1 illustrates a generic SSD architecture 100, with an SSD 102 communicatively coupled with a host device 104 through a primary communication interface 106. Embodiments of the invention are not limited to a configuration as depicted in FIG. 1, rather, embodiments may be applicable to operating environments other than SSDs and may be implemented in SSD configurations other than that illustrated in FIG. 1. For example, embodiments may be implemented to operate in other environments which rely on non-volatile memory storage components for writing and reading of data.

Host device 104 (or simply "host") broadly represents any type of computing hardware or software that makes, among others, data I/O requests or calls to one or more memory device. For example, host 104 may be an operating system executing on a computer, a tablet, a mobile phone, or generally any type of computing device that contains or interacts with memory. The primary interface 106 coupling host device 104 to SSD 102 may be, for example, a computer's internal bus or a communication cable or a wireless communication link, or the like.

The example SSD 102 illustrated in FIG. 1 includes an interface 110, a controller 112 (e.g., a controller having firmware logic therein), an addressing 114 function block, data buffer cache 116, error correction code (ECC) 118, and one or more non-volatile memory components 120a, 120b, 120n.

Interface 110 is a point of interaction between components, namely SSD 102 and host device 104 in this context, and is applicable at the level of both hardware and software. This allows a component to communicate with other components via an input/output system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 102 includes a controller 112, which incorporates the electronics that bridge the non-volatile memory components (e.g., NAND flash) to the host, such as non-volatile memory 120a, 120b, 120n to host device 104. The controller is typically an embedded processor that executes firmware-level code and is an important factor in SSD performance.

Controller 112 interfaces with non-volatile memory 120a, 120b, 120n via an addressing 114 fucntion block. The addressing 114 function operates, for example, to manage mappings between logical block addresses (LBAs) from the host 104 to a corresponding physical block address on the SSD 102, namely, on the non-volatile memory 120a, 120b, 120n of SSD 102. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 122, such as DRAM or some other local volatile memory component accessible to controller 112 and addressing 114. Alternatively, the table structure may be maintained more persistently across sessions in the SSD's non-volatile memory such as non-volatile memory 120a, 120b, 120n.

Addressing 114 interacts with data buffer cache 116 and error correction code (ECC) 118, in addition to non-volatile memory 120a, 120b, 120n. Data buffer cache 116 of an SSD 102 typically uses DRAM as a cache, similar to the cache in hard disk drives. Data buffer cache 116 serves as a buffer or staging area for the transmission of data to and from the non-volatile memory components, as well as serves as a cache for speeding up future requests for the cached data. Data buffer cache 116 is typically impemented with volatile memory so the data stored therein is not permanently stored in the cache, i.e., the data is not persistent.

ECC 118 is a system of adding redundant data, or parity data, to a message, such that it can be recovered by a receiver even when a number of errors were introduced, either during the process of transmission, or on storage.

Finally, SSD 102 includes one or more non-volatile memory 120a, 120b, 120n components. For a non-limiting example, the non-volatile memory components 120a, 120b, 120n may be implemented as flash memory (e.g., NAND or NOR flash), or other types of solid-state memory available now or in the future. The non-volatile memory 120a, 120b, 120n components are the actual memory electronic components on which data is persistently stored. The non-volatile memory 120a, 120b, 120n components of SSD 102 can be considered the analogue to the hard disks in hard-disk drive (HDD) storage devices.

Embodiments of the invention are described which manage data returns to a host in response to read commands from the host. Consequently, an optimum order in which data associated with read commands should be returned to the host is determinable and a more performant SSD storage device is attainable.

Memory Operation Monitor

Figure 2:
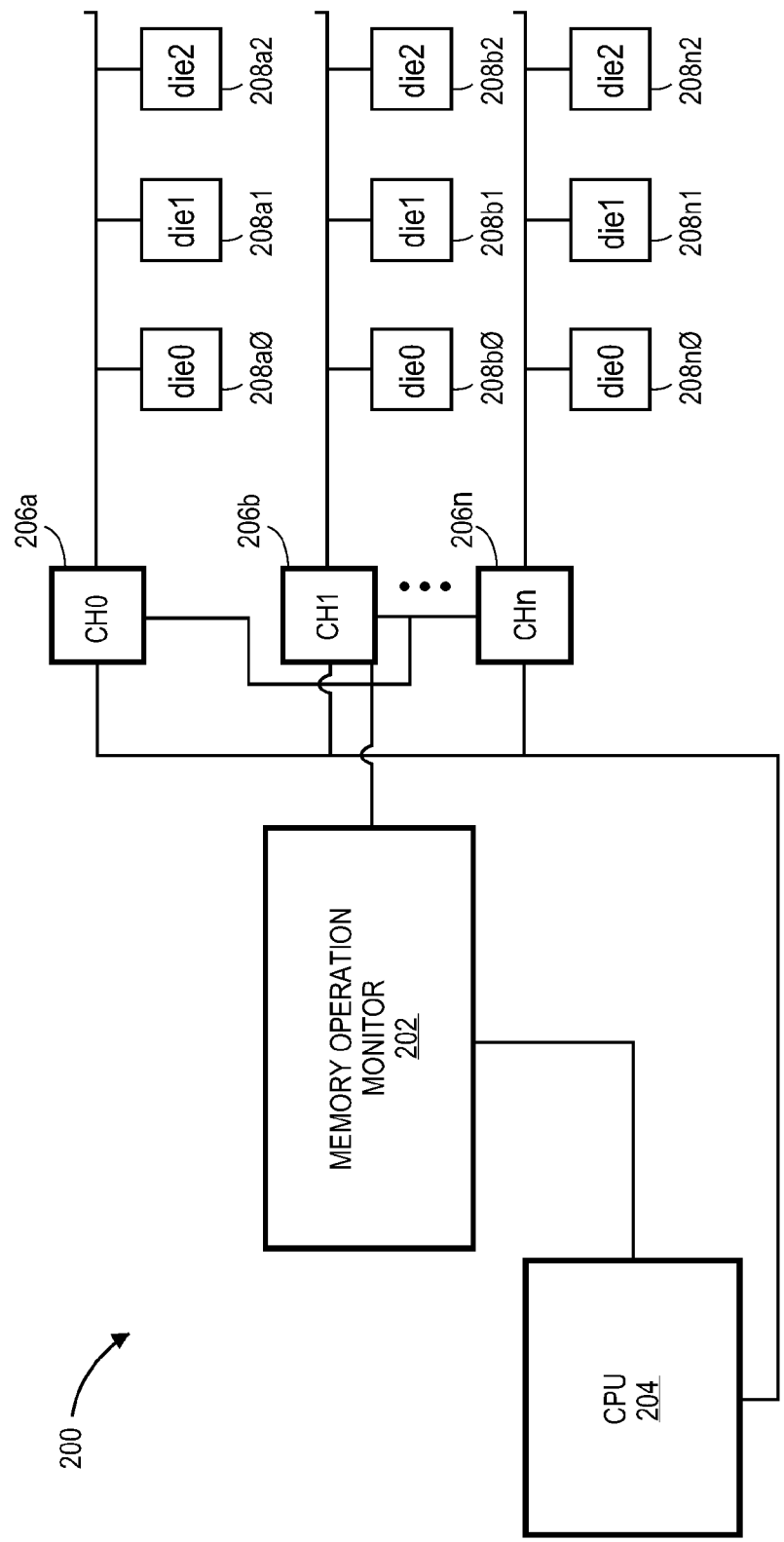
FIG. 2 is a block diagram illustrating a portion of an example operating environment, focusing on a memory operation monitor, in which embodiments of the invention may be implemented.

FIG. 2 is a block diagram illustrating a portion of an example operating environment, focusing on a memory operation monitor, in which an embodiment of the invention may be implemented. Example operating environment 200 includes a memory operation monitor 202 (hereafter referred to as "operation monitor") communicatively coupled to a CPU 204. Operation monitor 202 is further coupled to one or more channels 206a, 206b, 206n, where each channel is coupled to one or more non-volatile memory dies. For example purposes, FIG. 2 depicts channel 206a coupled to and communicating with die 208a0, die 208a1, die 208a2; channel 206b coupled to and communicating with die 208b0, 208b1, 208b2; and channel 206n coupled to and communicating with die 208n0, 208n1. Note that the number of channels and corresponding memory dies depicted in FIG. 2 is for purposes of example and embodiments of the invention are not limited to the exact configuration depicted.

Figure 3:
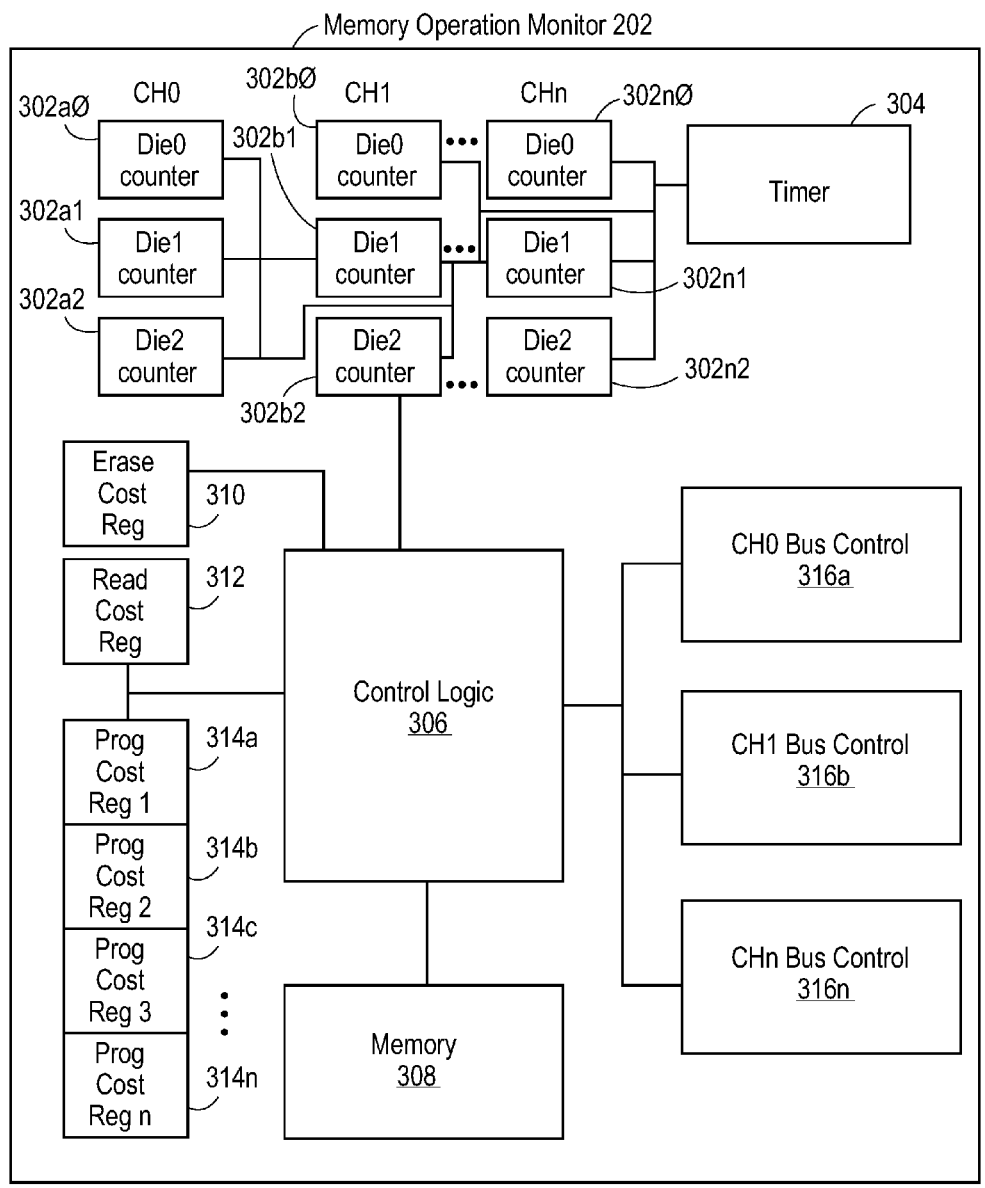
FIG. 3 is a block diagram illustrating a memory operation monitor, according to an embodiment of the invention.

According to embodiments, operation monitor 202 operates as described in reference to FIG. 3. Generally, operation monitor 202 can be considered as a hardware accelerater that is configured to assist the controller in performing executable tasks. According to an embodiment, operation monitor 202 is implemented in controller 112 (FIG. 1) but practice of embodiments of the invention are not so limited. Therefore, operation monitor 202 could be implemented essentially anywhere within SSD 102 (FIG. 1), for example, even in one or more of the memory dies 208a0-208n1. Operation monitor 202 may be implemented in firmware or in hardware. As is described in more detail in reference to FIG. 3, operation monitor 202 functions generally as an estimator function.

Operating environment 200 may include a dedicated or shared CPU 204 to execute instructions, procedures, etc. associated with the functionality of operation monitor 202. CPU 204 is an SSD 102 processor which can run executable logic for servicing the operations associated with memory dies 208a0-208n1. Similarly, each of channels 206a, 206b, 206n interface with each other as well as with their respective memory dies. A channel can be considered a communication "pipeline" between multiple entities or components. Therefore, channels 206a, 206b, 206n of SSD 102 function as communication and operational lines between operation monitor 202 and each channel's respective memory dies, and between CPU 204 and each channel's respective memory dies.

Flash memory is a type of non-volatile memory. Flash memory is a type of electrically erasable programmable read-only memory (EEPROM). A memory die is a hardware unit of non-volatile memory. A flash memory die is a discrete integrated circuit die, wherein such die includes at least one flash memory integrated circuit. The dies are the low level medium on which data is stored on flash memory.

FIG. 3 is a block diagram illustrating a memory operation monitor, according to an embodiment of the invention. Memory operation monitor 202 of FIG. 3 includes multiple die counters, each of which is associated with one or more corresponding memory dies. For example, die counters 302a0, 302a1, 302a2 are associated with corresponding dies 208a0, 208a1, 208a2 (FIG. 2); die counters 302b0, 302b1, 302b2 are associated with corresponding dies 208b0, 208b1, 208b2 (FIG. 2); and die counters 302n0, 302n1, 302n2 are associated with corresponding dies 208n0, 208n1, 208n2 (FIG. 2). As with the number of memory dies, note that the number of die counters depicted in FIG. 3 is for purposes of example and embodiments of the invention are not limited to the exact configuration and number of die counters depicted.

Die counters 302a0-302n2 are data structures used to track the completion time associated with read operations on corresponding dies 208a0-208n2 (FIG. 2). The estimated time to complete a read operation on a particular die is characterized by a "operation cost" metric which is stored in the corresponding die counter. The operation cost values stored in the die counters 302a0-302n2 are generated for every flash operation submitted to the dies 208a0-208n2 and are based on, according to an embodiment, the die history and the physical location of the operation.

Memory operation monitor 202 includes a timer 304 which is associated with the die counters 302a0-302n2. Timer 304 generates a periodic event, such as a clock tick, that decrements all the die counters 302a0-302n2. For a non-limiting example, timer 304 may generate a 1 µs clock tick. Once initialized, timer 304 ticks regardless of any read command. Timer 304 may be implemented, for example, as a digital counter that decrements at a fixed frequency which is often configurable. More sophisticated timers may use comparison logic to compare the timer value with a specific value, set by software or other logic, that triggers some action when the timer value matches the preset value. This type of timer can be used, for example, to generate a pulse. According to an embodiment, a digital counter using comparison logic to generate a pulse is used to decrement the values in die counters 302a0-302n2. However, the type of timer used may vary from implementation to implementation.

Thus, operation monitor 202 estimates and manages the completion time of flash read operations on all flash dies comprising a solid state drive, by loading die counters 302a0-302n2 with an operation cost and decrementing these operation cost values every clock tick from timer 304.

Memory operation monitor 202 includes a one or more program cost registers 314a, 314b, 314c, 314n. Program cost registers 314a-314n are used to account for the time it takes to complete a page program operation, otherwise known as a write operation. The number of program cost registers depicted in FIG. 3 is for purposes of example and embodiments of the invention are not limited to the exact configuration and number of program cost registers depicted. The number of cost registers may be a matter of design choice and may be based on the non-volatile memory 120a-120n (FIG. 1) and SSD 102 (FIG. 1) architecture, for example. However, according to an embodiment, four cost registers are used to hold four possible values for a program cost, where such program cost values account for programming variation due to page location within the non-volatile memory 120a-120n. General program cost register 314a-314n values can be predetermined from the non-volatile memory 120a-120n, but these values vary based on the relevant location on the non-volatile memory at which the requested data is stored, based on the type of non-volatile memory, and the like.

Operation monitor 202 includes an erase cost register 310 and a read cost register 312. Erase cost register 310 is used to store a value representing the time it takes to complete an erase operation and the read cost register 312 is used to store a value representing the time it takes to complete an erase operation. A single erase cost register 310 and a single read cost register 312 are shown in FIG. 3 for purposes of simplicity, and embodiments of the invention could be implemented as shown for a relatively simple implementation of the broader teachings described herein. That is, a simple implementation may utilize simple registers to store the various cost information.

However, read, erase, and program costs vary over the life of an SSD and over the different blocks within a die 208a0-208n2. Therefore, implementations of embodiments may vary in the level of granularity at which costs are estimated. Therefore, a relatively more complex implementation of embodiments may use memory 308 to store many variations of read, erase, and program costs on a die, block, or page basis, and as these costs change over the life of the drive. A larger memory 308 storing many variations of cost metrics is likely to produce a more accurate cost estimate, so cost granularity versus estimation accuracy is a tradeoff that can be managed at the implementation level.

One reason that program (i.e., write operation) costs, read costs and erase costs are considered is that the time of completion of a read operation on a non-volatile memory die 208a0-208n2, and thus the optimum order in which data is returned to the host 104 (FIG. 1), is affected by write, erase and read operations executing contemporaneous with read operations, for example, due to host write operations and garbage collection operations (i.e., a random mix scenario), as well as read operations due to other host commands targeting the same die (i.e., a random read scenario). Therefore, the optimum order of commands in which data should be returned to the host 104 (FIG. 1) does not necessarily correspond to the order in which the host sent the commands to the SSD 102 (FIG. 1) due at least in part to random mix and random read scenarios as well as background operations.

Control logic 306 of operation monitor 202 is the logic which executes to populate and manage the die counters 302a0-302n2 and to configure the various registers, such as program cost registers 314a-314n, the erase cost register 310, and the read cost register 312, as well as any other registers that may be implemented in alternative embodiments of operation monitor 202. Control logic 306 may also perform other tasks and computations in support of determining an optimum order in which to return data to the host 104, such as averaging various operation costs (e.g., erase costs, read costs) across multiple dies 208a0-208n2 (FIG. 2) or across multiple non-volatile memory 120a-120n (FIG. 1), such as adjusting register operation costs based on current or actual operation completion times, and the like. The scope of control logic 306 is not intended to be limited and expansion of such logic to perform other functions is specifically contemplated.

Operation monitor 202 includes one or more channel bus control 316a, 316b, 316n, each corresponding to a respective channel 206a, 206b, 206n (FIG. 2). According to an embodiment, channel bus controls 316a-316n are configured to detect the start and the end of operations on dies 208a0-208n2 (FIG. 2), for example, by snooping channel buses (FIG. 2) over which channels 206a-206n facilitate operations to dies 208a0-208n2. Such detected operation activities can be used by control logic 306 to populate and manage the operation cost values of die counters 302a0-302n2.

Memory 308 of operation monitor 202 is memory available for use by operation monitor 202 for various purposes, some of which are described in more detail herein in the context of the desired cost metric granularity and of self-adjustment features that may be embodied in operation monitor 202. The type and form of memory 308 is not limited, and may vary from implementation to implementation based on related design constraints, goals, and the like.

Method for Managing Returns to a Host

Figure 4:
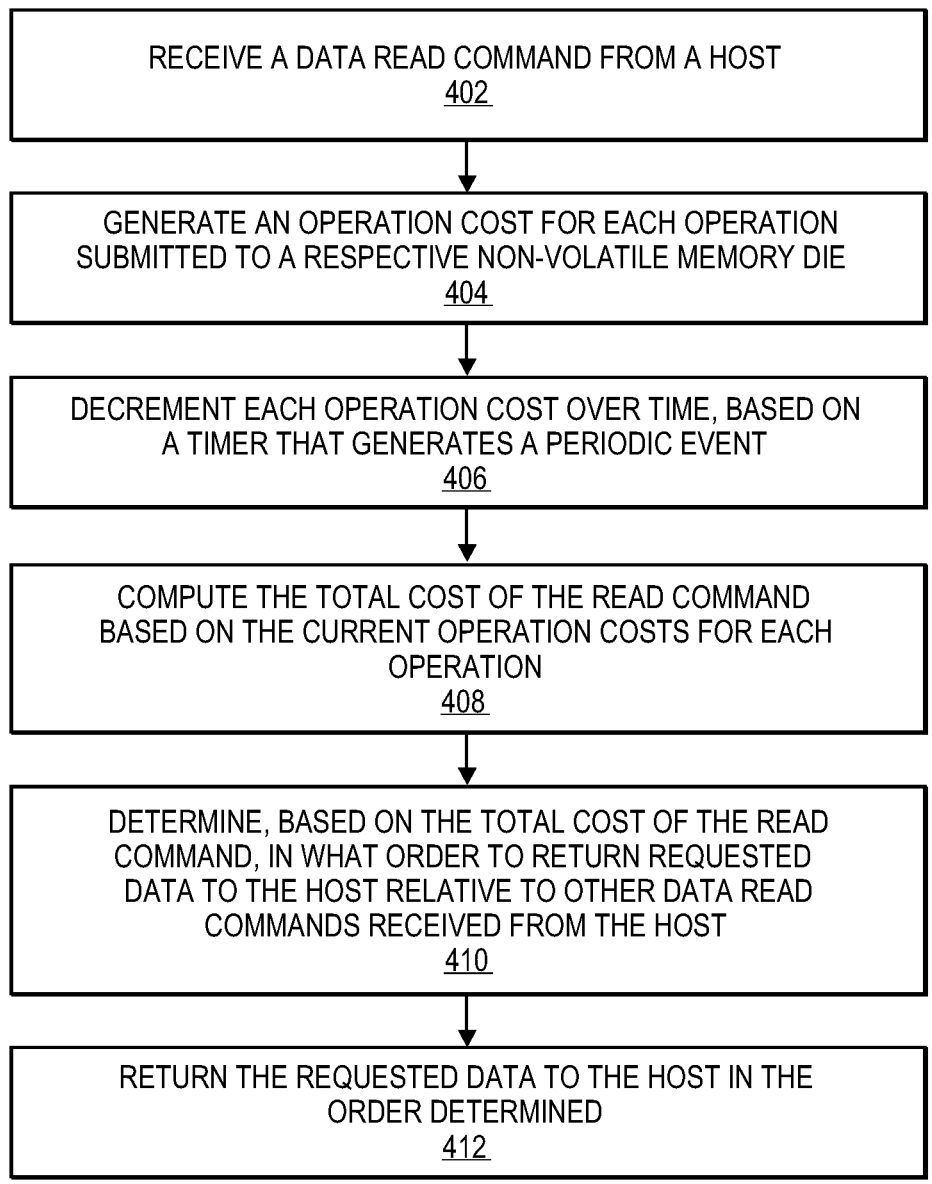
FIG. 4 is a flow diagram illustrating a method for managing returns to a host, according to an embodiment of the invention.

FIG. 4 is a flow diagram illustrating a method for managing returns to a host, according to an embodiment of the invention. The process illustrated in FIG. 4 may be implemented in an SSD such as SSD 102 (FIG. 1). More specifically, the process illustrated in FIG. 4 may be implemented in controller 112 (FIG. 1) of SSD 102, according to an embodiment. Further, according to an embodiment the process of FIG. 4 is implemented in memory operation monitor 202 (FIG. 2). The process logic may be implemented as analog or digital hardware circuitry within SSD 102 or as firmware instructions executed by a processor, such as CPU 204 (FIG. 2) or an MPU, within the SSD 102.

At block 402 of FIG. 4, a data read command is received from a host. For example, a data read command is received from host device 104 (FIG. 1) at controller 112 (FIG. 1) via interface 110 (FIG. 1) of SSD 102 (FIG. 1). In a queued command system, a host can send many read and write commands to a storage device such as SSD 102, i.e., more than the SSD 102 can process concurrently and instantaneously. Notably, the order in which commands are sent by the host is not always the best order in which to answer or return data to the host for the best SSD performance. This is partly because the latency to read data from flash memory dies varies based on, for example, whether or not the target die is idle and whether or not the target die is busy with an erase, page program or read operation.

The controller 112 (FIG. 1) has "knowledge" of where data is stored within non-volatile memory 120a-120n (FIG. 1). Thus, the controller 112 may fetch data from memory in response to a request in the order in which requests are received, however, different operations take different amounts of time depending, for example, on what and how the non-volatile memory is currently operating, what the memory's previous operations were, where the relevant data is located in memory, and the like. Significantly, embodiments described herein determine an optimum order in which to return data to the host for performance purposes. By contrast, if a non-optimum return order is utilized then the system is often required to wait longer and/or more often for other memory operations to complete before data can be returned to the host.

At block 404, an operation cost is generated for each operation submitted to a respective non-volatile memory die. For example, based on the values of the erase cost register 310 (FIG. 3), the read cost register 312 (FIG. 3), and the program cost registers 314a-314n (FIG. 3), and on what the target memory dies are currently processing or have queued, control logic 306 (FIG. 3) of memory operation monitor 202 (FIG. 2) builds and stores operation costs for the target dies (e.g., one or more of dies 208a0-208n2 of FIG. 2) in corresponding die counters 302a0-302n2 (FIG. 3). Note that the operation costs may be, but are not necessarily, generated in response to the read request from the host.

According to an embodiment, the operation cost values stored in the counters are automatically generated for every non-volatile memory operation submitted to the dies, for a particular read command. As previously described, control logic 306 (FIG. 3) can use information obtained by channel bus controllers 316a-316n (FIG. 3) from respective channel buses, e.g., operation start and end times, to compute the current values for the various die counters 302a0-302n2 (FIG. 3) in response to a read command. Alternatively, the operation cost values stored in the counters are automatically generated and constantly managed for every non-volatile memory die and is, therefore, available when requested in response to a read command from the host. Thus, control logic 306 can use information obtained by channel bus controllers 316a-316n from respective channel buses to trigger initialization and flushing of the various die counters 302a0-302n2 over time.

At block 406, over time, each operation cost is decremented based on a timer which generates a periodic event. For example, the operation costs generated for the target dies (e.g., one or more of dies 208a0-208n2 of FIG. 2) in corresponding die counters 302a0-302n2 (FIG. 3) are decremented over time based on the clock tick of timer 304 (FIG. 3). Assuming for discussion that one or more dies is currently busy with an erase, read, or write operation, then the operation cost in the corresponding dies reflect the time to completion for the respective current operation. Then, as time passes and the operations move to completion, the operation costs in the die counters are decreasing accordingly based on the decrementing timer 304 clock tick, with the intent being to decrement the operation cost of the current operation to zero coincident with the current operation completion.

For certain types of non-volatile memory, such as NAND flash, the maximum amount of data that can be read from or written to the memory is a page. For example, a page may be 8 Kb of data. Therefore, a read or write command is often spread across multiple dies. Upon receiving a host data command describing a read operation, the controller 112 (FIG. 1) firmware can break the data command into die read operations, the number of which depends of the command length. For example, with 8 Kb pages, a 64 Kb read command from the host would require eight reads from the dies, i.e., eight reads of 8 Kb each for a 64 Kb read command.

At block 408, the total cost of the read command received from the host is computed based on the current operation costs for each operation submitted to a respective non-volatile memory die. For example, the maximum time to completion of all the read operations required to retrieve each segment of data from the dies, is calculated. Continuing with the 64 Kb read command example, the operation costs for each of the eight dies needed to be read in order to fulfill the read command from the host are compared to determine the maximum time to completion of this set of die read operations, to compute the total operation cost of the read command. As discussed, the time to completion of each read operation takes into account what each die is currently doing, and may take into account what each die had done during its operational life.

For example and according to one embodiment, while the operation monitor 202 (FIG. 3) is responsible for building and maintaining the operation costs in the die counters 302a0-302n2 (FIG. 3) as described, the controller 112 (FIG. 1) firmware is responsible for computing the total operation cost, as at block 408. However, the distribution of functionality may vary from implementation to implementation and is not limited to the distribution described. For example, in an alternative embodiment the total operation cost may be computed by operation monitor 202 and returned to the controller 112 firmware.

At block 410, based on the total cost of the read command computed at block 408, it is determined in what order to return requested data to the host, relative to other read commands received from the host. As discussed, the order in which commands are sent by the host is not always the best order in which to answer or return data to the host for the best SSD performance. The method of FIG. 4 estimates the "best" or "optimum" order in which to return data to the host without giving primary regard to the order in which various read commands are received from the host. As such, die operations having the smallest operation cost, i.e., having the shortest time to completion, can be returned to the host before die operations having larger operation costs and time to completion, so that returns are queued to avoid longer operations blocking the return of shorter operations.

For example and according to one embodiment, the controller 112 (FIG. 1) firmware is responsible for determining the return order, as at block 410. However, the distribution of functionality may vary from implementation to implementation and is not limited to the distribution described. For example, in an alternative embodiment the return order may be computed by operation monitor 202 and returned to the controller 112 firmware.

To summarize how an operation cost estimation process may proceed, according to an embodiment, upon receiving a read command from a host 104 (FIG. 1) the controller 112 (FIG. 1) queries the operation monitor 202 (FIG. 2 and FIG. 3) for the operation cost of each non-volatile memory die (of dies 208a0-208n2 of FIG. 2) targeted by the read command. Effectively the controller 112 queries the operation monitor 202 for the amount of time to complete the read of each targeted die, in view of the current state of operation of each targeted die. The controller 112 then computes the total cost of the read command based on the operation costs for all the targeted dies. From the total cost of the read command the controller can determine a high performance order in which to return data in response to the read command relative to other read commands from the host.

Self-Adjustment of Estimator Mechanism

Because the characteristics and performance capabilities of flash memory change over time and with use (e.g., the program time, erase time, etc.), and the operation cost estimates are based in part on the characteristics of the flash, the initial operation cost values may be adjusted over the lifetime of the drive, according to an embodiment in which flash is used for the non-volatile memory. As such, the values in the erase cost register 310, the read cost register 312, and the program cost registers 314a-314n (FIG. 3) may be adjusted over time based on the completion time variation that occurs with use, i.e., based on the operational history of the flash.

According to an embodiment, operation monitor 202 (FIG. 2) tracks the number of times that each dies is used for the various operations to identify operation cost changes over time due to the physics of the flash. For this purpose, operation monitor 202 may use actual data from the flash, which may be obtained from channel bus controls 316a-316n (FIG. 3), to adjust the operation cost register values as the flash deteriorates. Such information could provide precise die-dependent deterioration associated with each flash memory component, and could be stored in memory 308 (FIG. 3) of operation monitor 202. The precision of such information may vary from implementation to implementaion and thus could be collected and stored "per-die" or even "per-block". Therefore, memory 308 can be sized accordingly, based on the level of precision implemented for the flash deterioration data.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing returns to a host in response to commands received by a solid-state data storage device from said host, the method comprising:
   receiving a data read command from said host;
   computing a total estimated time to completion of said read command based on an estimated time to completion for each operation submitted to a plurality of non-volatile memory dies corresponding to said read command;
   determining, based on said total estimated time to completion of said read command, in what order to return requested data to said host relative to other data read commands received from said host; and
   returning said requested data to said host in the order determined.

2. The method of claim 1, wherein said total estimated time to completion of said read command is based on a time for completion of an erase operation on each of multiple said non-volatile memory dies.

3. The method of claim 1, wherein said total estimated time to completion of said read command is based on an average time for completion corresponding to erase operations on multiple said non-volatile memory dies.

4. The method of claim 1, wherein said total estimated time to completion of said read command is based on a time for completion of a read operation on each of multiple said non-volatile memory dies.

5. The method of claim 1, wherein said total estimated time to completion of said read command is based on an average time for completion corresponding to read operations on multiple said non-volatile memory dies.

6. The method of claim 1, wherein said total estimated time to completion of said read command is based on a time for completion of a write operation on each of multiple said non-volatile memory dies.

7. The method of claim 1, wherein said total estimated time to completion of said read command is based on an average time for completion corresponding to write operations on multiple said non-volatile memory dies.

8. The method of claim 1, wherein said total estimated time to completion of said read command is based on a time for completion of at least one of an erase operation, a read operation, and a write operation on each of multiple said non-volatile memory dies.

9. The method of claim 8, wherein said total estimated time to completion of said read command is based on an average time for completion corresponding to said operations on said multiple non-volatile memory dies.

10. The method of claim 8, wherein said total estimated time to completion of said read command is based on a maximum time for completion corresponding to said operations on said multiple non-volatile memory dies.

11. The method of claim 1, further comprising:
determining, based on the length of said read command, the number of necessary read operations to said non-volatile memory dies to fulfill said read command.

12. The method of claim 1, further comprising:
determining, based on the length of a page corresponding to one or more of said non-volatile memory dies, the number of necessary read operations to said non-volatile memory dies to fulfill said read command.

13. A solid-state data storage controller embodying one or more sequences of instructions which, when executed by one or more processors, cause performance of:
computing a total estimated time to completion of a data read command received from a host based on an estimated time to completion for each operation submitted to a plurality of non-volatile memory dies corresponding to said read command;
determining, based on said total estimated time to completion of said read command, in what order to return requested data to said host relative to other data read commands received from said host; and
returning said requested data to said host in the order determined.

14. The solid-state data storage controller of claim 13, wherein said total estimated time to completion of said read command is based on a time for completion of at least one of an erase operation, a read operation, and a write operation on each of multiple said non-volatile memory dies.

15. The solid-state data storage controller of claim 14, wherein said total estimated time to completion of said read command is based on an average time for completion corresponding to said operations on said multiple non-volatile memory dies.

16. The solid-state data storage controller of claim 14, wherein said total estimated time to completion of said read command is based on a maximum time for completion corresponding to said operations on said multiple non-volatile memory dies.

17. The solid-state data storage controller of claim 13, wherein said one or more sequences of instructions, when executed, further cause performance of:
determining, based on the length of said read command, the number of necessary read operations to said non-volatile memory dies to fulfill said read command.

18. The solid-state data storage controller of claim 13, wherein said one or more sequences of instructions, when executed, further cause performance of:
determining, based on the length of a page corresponding to one or more of said non-volatile memory dies, the number of necessary read operations to said non-volatile memory dies to fulfill said read command.

19. A solid-state data storage device comprising non-volatile memory dies and a controller for managing operations on said non-volatile memory dies, said data storage device comprising:
said controller embodying one or more sequences of instructions which, when executed by one or more processors, cause performance of:
computing a total estimated time to completion of a data read command received from a host based on an estimated time to completion for each operation submitted to a plurality of non-volatile memory dies corresponding to said read command;
determining, based on said total estimated time to completion of said read command, in what order to return requested data to said host relative to other data read commands received from said host; and
returning said requested data to said host in the order determined.

20. The solid-state data storage device of claim 19, wherein said total estimated time to completion of said read command is based on a time for completion of at least one of an erase operation, a read operation, and a write operation on each of multiple said non-volatile memory dies.

21. The solid-state data storage device of claim 20, wherein said total estimated time to completion of said read command is based on an average time for completion corresponding to said operations on said multiple non-volatile memory dies.

22. The solid-state data storage device of claim 20, wherein said total estimated time to completion of said read command is based on a maximum time for completion corresponding to said operations on said multiple non-volatile memory dies.

23. The solid-state data storage device of claim 19, wherein said one or more sequences of instructions, when executed, further cause performance of:
determining, based on the length of said read command, the number of necessary read operations to said non-volatile memory dies to fulfill said read command.

24. The solid-state data storage device of claim 19, wherein said one or more sequences of instructions, when executed, further cause performance of:
determining, based on the length of a page corresponding to one or more of said non-volatile memory dies, the number of necessary read operations to said non-volatile memory dies to fulfill said read command.

* * * * *